(12) United States Patent
Schwetzler et al.

(10) Patent No.: US 6,641,089 B2
(45) Date of Patent: Nov. 4, 2003

(54) FLAP ARRANGEMENT FOR VARYING THE AERODYNAMIC LIFT GENERATED BY AN AERODYNAMIC ELEMENT OF AN AIRCRAFT

(75) Inventors: Detlev Schwetzler, Delmenhorst (DE); Peter May, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/255,765

(22) Filed: Sep. 25, 2002

(65) Prior Publication Data

US 2003/0057332 A1 Mar. 27, 2003

(30) Foreign Application Priority Data

Sep. 27, 2001 (DE) .......................... 101 47 827

(51) Int. Cl.[7] ............................... B64C 3/00
(52) U.S. Cl. ..................... 244/198; 244/204; 244/206; 244/212; 244/215
(58) Field of Search ................. 244/198, 204, 244/206, 211, 212, 215, 217

(56) References Cited

U.S. PATENT DOCUMENTS

| 1,893,064 | A | | 1/1933 | Zaparka | |
|---|---|---|---|---|---|
| 3,092,354 | A | * | 6/1963 | Alvarez-Calderon | 244/10 |
| 3,141,637 | A | * | 7/1964 | Dornier et al. | 244/215 |
| 3,447,763 | A | * | 6/1969 | Allcock | 244/207 |
| 3,536,278 | A | * | 10/1970 | Walley | 244/163 |
| 4,311,289 | A | | 1/1982 | Finch | |
| 4,314,795 | A | | 2/1982 | Dadone | |
| 4,542,868 | A | | 9/1985 | Boyd | |
| 4,717,097 | A | * | 1/1988 | Sepstrup | 244/217 |
| 4,867,396 | A | | 9/1989 | Wainfan | |
| 5,265,830 | A | * | 11/1993 | Allen | 244/213 |
| 5,518,210 | A | | 5/1996 | Friberg | |
| 5,884,872 | A | * | 3/1999 | Greenhalgh | 244/201 |
| 5,992,792 | A | * | 11/1999 | Arnason | 244/13 |
| 6,109,567 | A | * | 8/2000 | Munoz Saiz | 244/215 |
| 6,382,561 | B1 | | 5/2002 | Brink | |

FOREIGN PATENT DOCUMENTS

| FR | 921144 | 4/1947 |
|---|---|---|
| IT | 329400 | 9/1935 |

OTHER PUBLICATIONS

SAE Technical Paper Series (892288), entitled "Application of Divergent Trailing–Edge Airfoil Technology to the Design of a Derivative Wing"; by R.D. Gregg et al.; Sep. 25–28, 1989; pp. 1 to 13.

(List continued on next page.)

Primary Examiner—J. Woodrow Eldred
(74) Attorney, Agent, or Firm—W. F. Fasse; W. G. Fasse (57) ABSTRACT

An auxiliary flap is movably arranged on a planar trailing edge of an aerodynamic element such as a wing, rudder, stabilizer, or flap. The auxiliary flap is rotatable and/or slidable relative to the aerodynamic element, to move selectively into three positions. In a first position, a free edge of the auxiliary flap protrudes into an airflow boundary layer on one side of the aerodynamic element, to decrease lift. In a second position, a free edge of the aerodynamic element protrudes into an airflow boundary layer on the other side of the aerodynamic element, to increase lift. In a third neutral position, the auxiliary element does not protrude into either boundary layer, so as not to influence lift. The auxiliary flap is simple and rapidly acting. The flap protrudes substantially perpendicularly into the boundary layer flow. The auxiliary flap has a planar plate shape.

28 Claims, 3 Drawing Sheets

OTHER PUBLICATIONS

AIAA 31$^{st}$ Aerospace Sciences Meeting & Exhibit, AIAA (93–0647); entitled "Lift Enhancement of an Airfoil Using a Gurney Flap and Vortex Generators", by Bruce L. Storms et al.; Jan. 11–14, 1993, pp. 1 to 8.

AIAA 11$^{th}$ Applied Aerodynamics Conference; AIAA 93–3504, "Lift Enhancing Tabs on Multi–Element Airfoils", by James C. Ross et al.; pp. 1 to 8, Aug. 9–11, 1993.

Journal of Aircraft, vol. 32, No. 5, entitled "Experimental Study of Lift–Enhancing Tabs on a Two–Element Airfoil", by Bruce L. Storms et al.; Sep.–Oct., 1995, pp. 1072–1078.

Journal of Aircraft, vol. 34, No. 4, entitled "Enhanced Aerofoil Performance Using Small Trailing–Edge Flaps", by A. W. Bloy et al.; Jul.–Aug., 1997, pp. 569 to 571.

AIAA Journal, vol. 35, No. 12, entitled "Gurney Flap Scaling for Optimum Lift–to–Drag Ratio"; by Philippe Giguére et al., Dec. 1997, pp. 1888 to 1890.

Journal of Aircraft, vol. 35, No. 2, entitled "Gurney Flap Experiments on Airfoils, Wings, and Refection Plane Model", by Roy Myose et al.; Mar.–Apr., 1998, pp. 206–211.

Journal of Aircraft, vol. 36, No. 2, Engineering Notes, entitled "Gurney Flap Experiments on Airfoil and Wings", by C. P. van Dam et al.; Date: Dec. 7, 1998, pp. 484 to 486.

Hermann—Föttinger—Institut Für Strömungsmechanik, Technical University of Berlin, Abschlussbericht, Vorhaben: Beeinflussung von Strömungsablösungen an Trafflügeln., by R. Meyer et al., pp. 3 to 6; 39 to 46.

"Jane's All The World's Aircraft", published in Janes Yearbooks, 1976–1977 Edition, London, England.

AIAA Journal Of Aircraft, Paper No. 80–3034, entitled "Design of Air–Foils for High Lift", by Robert H. Liebeck; Sep. 1978; pp. 25, 45–47.

* cited by examiner

FLAP ARRANGEMENT FOR VARYING THE AERODYNAMIC LIFT GENERATED BY AN AERODYNAMIC ELEMENT OF AN AIRCRAFT

PRIORITY CLAIM

This application is based on and claims the priority under 35 U.S.C. §119 of German Patent Application 101 47 827.5, filed on Sep. 27, 2001, the entire disclosure of which is incorporated herein by reference.

FIELD OF THE INVENTION

The invention relates to a flap arrangement that can be selectively extended to protrude into an airflow boundary layer of an aerodynamic element, such as a wing, an aileron, a rudder, an elevator, a stabilizer surface, or a flap, preferably having a planar trailing edge, so as to selectively vary the aerodynamic lift generated by this aerodynamic element.

BACKGROUND INFORMATION

A great variety of different flap arrangements for varying the aerodynamic lift generated by an aerodynamic element of an aircraft are generally known. For example, there are many known configurations of high lift flaps arranged along the trailing edge of a main lifting wing of an aircraft. Such conventionally known flap arrangements are generally rather complicated, i.e. having a complex geometry and construction, and require a complex support and drive mechanism for selectively extending and retracting the flap arrangement. Such flap arrangements typically and generally aim to selectively smoothly increase or reduce the chord length, the curvature, and/or the angle of attack of the sectional aerodynamic profile of the respective aerodynamic element.

As an alternative, it is also generally known to rigidly fix a sheet metal plate or the like on the trailing edge of an aerodynamic lift-generating element so as to form a perpendicular wall protruding substantially perpendicularly into the transverse plane airflow. This will alter the pressure distribution over the aerodynamic element, and therewith alter the magnitude of the lift and the resistance generated by this aerodynamic element. Although this has been known as a theoretical and experimental concept, it has never been further developed into a practically useful arrangement for varying the aerodynamic lift generated by an aerodynamic element of an aircraft.

SUMMARY OF THE INVENTION

In view of the above, it is an object of the invention to provide a flap arrangement that enables a rapid adjustment or variation of the aerodynamic lift generated by an aerodynamic element of an aircraft, so as to enable a controlled load variation and lift distribution of the aerodynamic element of the aircraft within projected effective or working ranges. It is another object of the invention to provide a flap arrangement that is extremely simple in design, construction, and operation. It is a further object of the invention to provide such a flap arrangement that can selectively either increase or decrease the aerodynamic lift generated by an aerodynamic element, in comparison to the clean configuration of the aerodynamic element. The invention further aims to avoid or overcome the disadvantages of the prior art, and to achieve additional advantages, as apparent from the present specification. The attainment of these objects is, however, not a required limitation of the present invention.

The above objects have been achieved according to the invention in a flap arrangement provided on a trailing edge of an aerodynamic lift-generating element of an aircraft. The aerodynamic lift-generating element will also simply be called an aerodynamic element herein, and may particularly be a main lifting wing, an auxiliary or secondary wing, a flap, an aileron, a rudder, an elevator, a stabilizer element such as the horizontal and vertical stabilizers or tail plane and fin of an aircraft tail unit, or the like. Throughout this specification, the terms "lift" and "aerodynamic lift" refer to the component of the aerodynamic force generated by the aerodynamic element in a direction perpendicular to the apparent air flow direction relative to the aerodynamic element. Thus, the general term "lift" is not limited to a vertically upward lift, but rather could also refer to a horizontally directed lateral aerodynamic lift, e.g. in the case of a rudder or the like.

According to the invention, a relatively small movable and controllable auxiliary flap is movably arranged at the trailing edge of an aerodynamic element in such a manner so that the auxiliary flap is selectively movable to any selected one of at least three positions. In a first end position, which is an upper end position in the case of a wing or the like as the aerodynamic element, the auxiliary flap protrudes into a first boundary layer of the airflow over a first surface of the aerodynamic element (i.e. into the upper boundary layer of the airflow along the upper surface of the wing). In a second end position (e.g. the lower end position in the case of a wing), the auxiliary flap protrudes into the second boundary layer of the airflow along the second surface of the aerodynamic element (e.g. the lower boundary layer of the airflow along the lower surface of the wing as the aerodynamic element). In a third neutral position, between the first and second end positions, the auxiliary flap does not protrude into and does not influence either of the two boundary layers.

The trailing edge of the aerodynamic element is preferably a flat planar trailing edge, rather than tapering to a single line edge at an intersection-of the two opposite aerodynamic surfaces of the aerodynamic element. Preferably further, the auxiliary flap has a configuration of a flat planar rectangular plate, i.e. without any aerodynamic airfoil shape, curvature, or thickness variation. Also, preferably, in at least the first and second positions, the auxiliary flap extends parallel to the flat planar trailing edge, and substantially perpendicular (e.g. 90°+10°) relative to a central chord line intersecting the trailing edge and extending between the first and second aerodynamic surfaces of the aerodynamic element. That also approximately corresponds to a substantially perpendicular protrusion of the auxiliary flap into the respective boundary layer in the respective end positions. In the third position, the auxiliary flap may remain parallel to the plane of the trailing edge, or may extend substantially parallel to or along (e.g. ±10°) the central chord line.

More specifically, in a first embodiment of the invention, the auxiliary flap is rotatably connected to the aerodynamic element, e.g. by rotational means, so that the auxiliary flap can be selectively rotated through approximately 180° to rotatably move the auxiliary flap among the above described first, second and third positions. The term "rotatable" does not require complete freedom to rotate through 360°, but rather also encompasses partial rotation or pivoting. In the first position, the auxiliary flap extends substantially perpendicularly to the chord line of the aerodynamic element, while in the second position the auxiliary flap extends substantially 180° opposite from the first position, and in the third position, the auxiliary flap extends substantially parallel to the chord line of the aerodynamic element, i.e. respectively 90° between the first and second positions. To achieve this, one of the longitudinally extending edges of the auxiliary flap is secured to a shaft that is rotatably supported and extends parallel to the trailing edge of the aerodynamic element in the direction of the span (e.g. the wing span) of the aerodynamic element. This shaft has a relatively small diameter, e.g. a diameter corresponding substantially to the thickness of the auxiliary flap.

Alternatively, instead of a shaft, a cylindrical drum or roll having a larger diameter can be rotatably supported and arranged along the trailing edge of the aerodynamic element. In this embodiment, the circular cross-section of the cylindrical drum is preferably at least partially received in a semi-cylindrical recess along the trailing edge of the aerodynamic element. The cross-sectional diameter of the drum is substantially greater than (e.g. 2, 3 or even 4 or more times) the cross-sectional thickness of the auxiliary flap, and may correspond to a dimension in the range of one quarter to one half of the height or thickness of the aerodynamic element at the trailing edge perpendicular to the chord line thereof.

The shaft or drum may additionally be slidable or shiftable in a direction along the planar trailing edge between the two opposite surfaces of the aerodynamic element. Thereby, the sliding or shifting of the shaft or drum can further accentuate the protrusion height of the auxiliary flap in the first and second positions achieved by rotation of the auxiliary flap about the axis of the shaft or drum.

Any conventionally known actuator and drive transmitting transmission mechanism, e.g. an arrangement of an electric motor, a hydraulic motor, a pneumatic motor, a pneumatic cylinder and/or a hydraulic cylinder, in combination with a gear drive, a toothed belt or gear belt drive, a worm gear drive, a shaft drive, a rack-and-pinion drive, or a crank drive can be connected to the shaft or drum for driving the movements thereof. The required actuation movements are controlled, e.g., by control signals provided by the aircraft's flight control computer via electrical conductors or the like.

In a second embodiment of the invention, the auxiliary flap is slidingly mounted on the trailing edge of the aerodynamic element, e.g. by sliding means. Particularly, the opposite side edges of the auxiliary flap extending in a direction between the two opposite sides of the aerodynamic element are slidingly received in corresponding guide rails or tracks provided on the trailing edge of the aerodynamic element. The auxiliary flap is slidingly shiftable along the guide rails or tracks parallel to the planar trailing edge of the aerodynamic element in either direction toward the opposite boundary layers of the airflow along the opposite surfaces of the aerodynamic element. The guide rails or tracks advantageously extend entirely from the first or upper surface of the aerodynamic element to the second or lower surface of the aerodynamic element. The maximum sliding displacement of the auxiliary flap in one direction sets the flap into its first end position protruding into the first boundary layer, while the maximum sliding displacement in the opposite direction sets the flap into its second end position protruding into the second boundary layer, and an intermediate sliding position of the flap represents the third neutral position in which the flap does not protrude into either one of the two boundary layers. This sliding flap can be driven by any of the above described actuators and transmission arrangements, and preferably is driven by a rotary drive through an eccentric cam that engages the auxiliary flap so as to selectively slidingly drive the auxiliary flap.

According to further special features of the invention, a plurality of separately actuatable auxiliary flaps of the above described type can be arranged along the trailing edge of the aerodynamic element. With such an arrangement, the individual auxiliary flaps can be individually and independently actuated so as to either increase, decrease, or not influence the local aerodynamic lift generated by the local associated area or portion of the aerodynamic element, such as a wing. In this manner, the lift distribution and therewith the load distribution along the span of the wing can be easily varied or adjusted.

Further according to the invention, the above described auxiliary flap may be provided on the trailing edge of any conventional lift influencing flap, e.g. along the trailing edge of the landing flap of an aircraft wing. Thereby, the inventive auxiliary flap allows a further adjustment or tailoring of the lift generated by the wing and its main flap, even with the conventional flap selectively extended or retracted into various configurations. The inventive auxiliary flap thus allows a fine-tuning or rapid-tuning adjustment and local variation of the lift generation pattern, of which the overall or gross lift generation is predominantly predetermined by the setting of the main flap.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

As generally discussed above, the invention relates to the arrangement of an auxiliary flap along the trailing edge of an aerodynamic lift-generating element of an aircraft. The aerodynamic element may be any major aerodynamic element of an aircraft, such as a wing, a main wing flap, an aileron, a rudder, an elevator, a tail plane, a vertical fin, or the like. The drawings show various embodiments of the inventive flap arrangement, in connection with a wing of an aircraft representing an example of the aerodynamic element. In each embodiment of the invention, the auxiliary flap is selectively movable to a first or upper end position in which the auxiliary flap protrudes into the first or upper boundary layer of the airflow along the first or upper surface of the aerodynamic element so as to reduce the aerodynamic lift, or to a second or lower end position in which the auxiliary flap protrudes into the second or lower boundary layer of the airflow along the second or lower surface of the aerodynamic element so as to increase the generated lift, or to a third central neutral position in which the auxiliary flap does not protrude into either boundary layer and thus does not influence or change the lift being generated.

Figure 1:
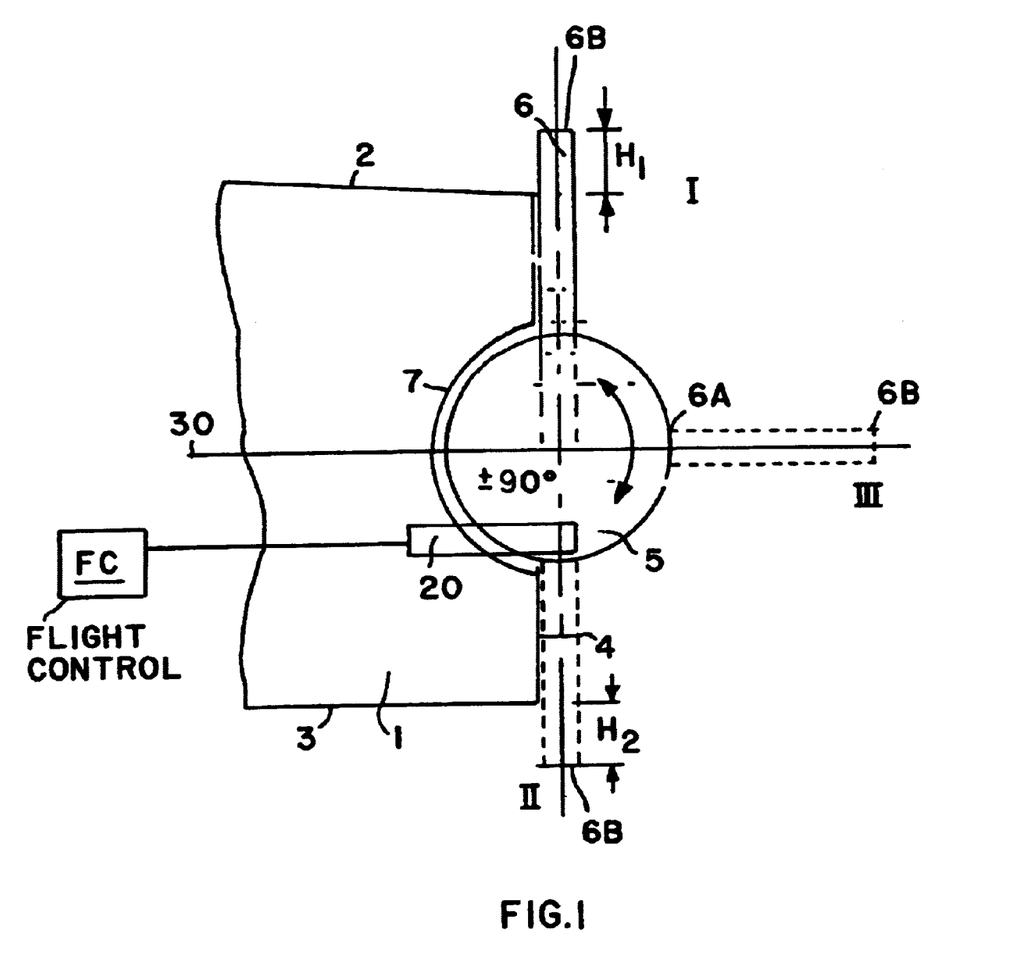
FIG. 1 is a schematic sectional view through the aerodynamic profile at the trailing edge of an aerodynamic lift-generating element, with a rotatable auxiliary flap according to the invention.

As shown in FIG. 1, an aerodynamic element 1, such as a wing of an aircraft, includes an upper (first) surface 2 and a lower (second) surface 3 along which flow respective boundary layers of the airflow, as well as a flat planar trailing edge 4 extending substantially perpendicularly between the upper surface 2 and the lower surface 3, i.e. along a plane that is substantially perpendicular (e.g. 90°±10°) to the central chord line 30 that intersects the trailing edge 4 and extends between the upper surface 2 and the lower surface 3 of the aerodynamic element 1. A cylindrical drum or roll 5 extends parallel along the trailing edge 4 in the direction of the wing span of the aerodynamic element 1. The drum or roll 5 is rotatably supported, e.g. using any known arrangement of rotation bearings, relative to the aerodynamic element 1. An auxiliary flap 6 having a shape of a rectangular flat plate is secured along one of its longitudinally extending edges 6A onto the cylindrical drum 5. The drum 5 is partially received in a semi-cylindrical recess 7 provided along the planar trailing edge 4 of the aerodynamic element 1.

With the above described arrangement, the auxiliary flap 6 can be rotated or pivoted about the axis of the drum 5 into a first upper position I (shown in solid lines) or selectively into a second lower position II (shown in dashed lines) or into a third central neutral position III (shown in dashed lines). Namely, by rotating the drum 5 and therewith the auxiliary flap 6 in successive 90° steps, the auxiliary flap 6 can be moved into any one of the three positions I, II, III as desired.

In the upper end position I, the free edge 6B of the auxiliary flap 6 protrudes by the amount or height $H_1$ into the upper boundary layer of the airflow over the upper surface 2 of the aerodynamic element 1. On the other hand, when the auxiliary flap 6 is in its lower second end position II, the free edge 6B of the auxiliary flap 6 protrudes by the amount or height $H_2$ into the lower boundary layer of the airflow over the lower surface 3 of the aerodynamic element 1. In the third central or neutral position III, the auxiliary flap 6 extends substantially along or parallel to the chord line 30 of the aerodynamic element 1 and thus does not protrude into either the upper or the lower boundary layer. Accordingly, in the upper end position I the auxiliary flap 6 reduces the lift generated by the aerodynamic element 1, in the lower end position II the auxiliary flap 6 increases the lift generated by the aerodynamic element 1, and in the third neutral position III the auxiliary flap 6 does not influence or change the lift generated by the aerodynamic element 1.

The rotating or pivoting movement of the drum 5 and therewith the auxiliary flap 6 can be achieved by any conventionally known actuator, as merely schematically represented by element 20 in FIG. 1. Basically, any conventionally known gear wheel drive, geared or toothed belt drive, worm drive, or crank drive can be used as the actuator 20 to provide the rotational movement of the drum 5 and therewith the auxiliary flap 6. In addition to the rotational or pivoting movement, the drum 5 and therewith the auxiliary flap 6 can also be slidingly shifted parallel to the planar trailing edge 4 of the aerodynamic element 1, to increase or accentuate the protrusion height $H_1$ or $H_2$ when the auxiliary flap 6 is in its end positions I or II. The sliding drive can be according to any conventional sliding arrangement. The control signals for controlling the actuation of the actuator 20 and therewith the auxiliary flap 6 are preferably provided via a conductor from the flight controller, e.g. the flight control computer FC of the aircraft.

Figure 2:
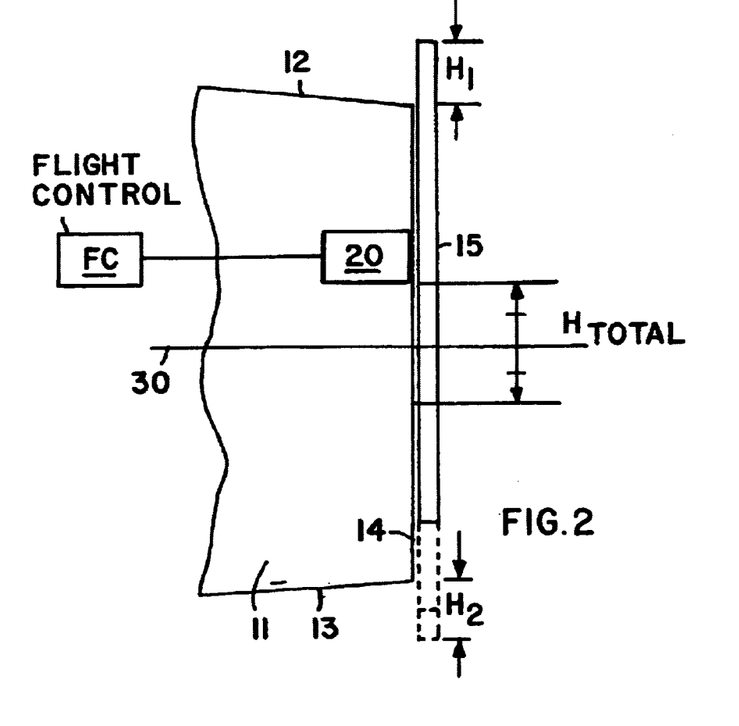
FIG. 2 is a schematic sectional view similar to that of FIG. 1, but showing a second embodiment with a linearly slidable auxiliary flap according to the invention.

The alternative embodiment shown in FIGS. 2 and 3 involves an aerodynamic element 11 such as an aircraft wing, with an upper surface 12 and a lower surface 13, along which respective boundary layers flow, as well as a planar trailing edge 14, generally like the arrangement also shown and described in connection with FIG. 1. In the present embodiment, however, the auxiliary flap 15 is not rotatably supported, but rather slidably supported relative to the trailing edge 14 of the aerodynamic element 11. Particularly, the two opposite upright side edges 15C and 15D of the auxiliary flap 15 are slidingly or rollingly supported by guide rails or tracks 16 so that the auxiliary flap 15 is slidable or shiftable parallel to the planar trailing edge 14 in a direction between the upper and lower boundary layers (also see FIG. 3). The guide rails 16 extend from the lower surface 13 to the upper surface 12 of the aerodynamic element 11.

By carrying out a sliding movement of the auxiliary flap 15, this auxiliary flap 15 can be selectively brought into its upper end position I, its lower end position II, or its central neutral position III. In the upper end position I, the upper free edge 15A of the auxiliary flap 15 protrudes by the amount or height $H_1$ into the upper boundary layer. In the lower end position II, the lower free edge 15B of the auxiliary flap 15 protrudes downwardly by the amount or height $H_2$ into the lower boundary layer. In the central neutral position III, neither the upper free edge 15A nor the lower free edge 15B of the auxiliary flap 15 protrude into the boundary layers. The maximum sliding or displacement path distance $H_{TOTAL}$ thus results from the sum of $H_1$ and $H_2$, in this example.

Figure 3:
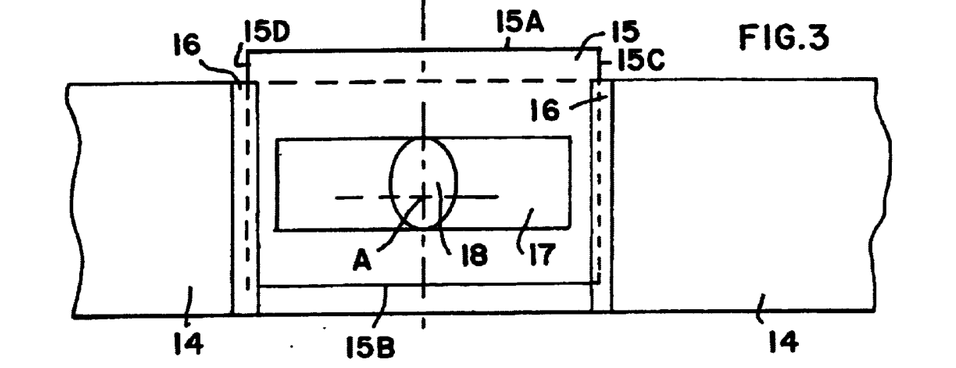
FIG. 3 is a schematic rear elevation view of the arrangement according to FIG. 2, as seen from the right side of FIG. 2.

As especially shown in FIG. 3, an eccentric cam 18 of an eccentric drive arrangement is received in an opening or recess 17 in the auxiliary flap 15. Thereby, a rotation of the eccentric cam 18 about the axis A will result, through the interaction of the cam 18 with the inner bounding walls of the opening 17, in a selected sliding displacement of the auxiliary flap 15 along the guide rails 16. As alternatives, any known drive arrangement for achieving a linear sliding displacement can be used to drive the auxiliary flap 15, for example a crank drive, a toothed gear rack or rack-and-pinion drive, a pneumatic cylinder drive, a hydraulic cylinder drive, etc. The drive arrangement 20 is merely schematically shown in FIG. 2. The drive power source may be an electric motor, a hydraulic motor, or a pneumatic motor, for example.

Figure 4:
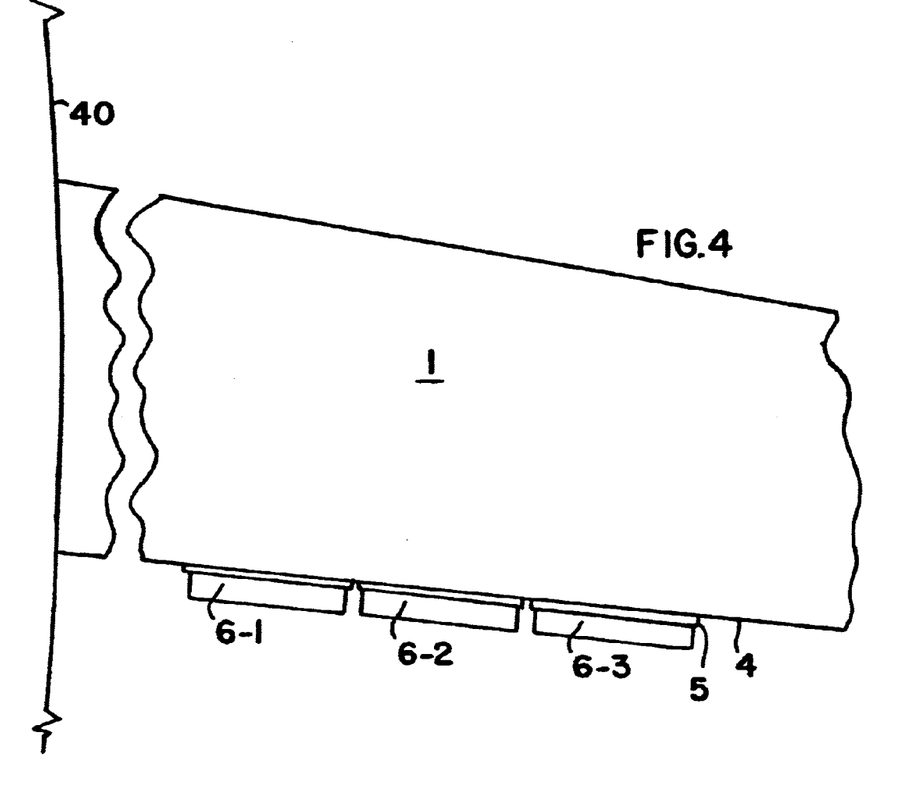
FIG. 4 is a schematic top plan view of an aircraft wing with plural separate, independently controllable, auxiliary flaps arranged along the trailing edge of the wing according to the invention.

A further advantageous embodiment of the invention is schematically shown in FIG. 4, in connection with a broken portion of a wing 1 extending from an aircraft fuselage 40. A plurality of auxiliary flaps 6-1, 6-2, 6-3 (which could be embodied according to the rotatable flap 6 or the slidable flap 15) are arranged successively along the trailing edge 4 of the wing 1 (representing an aerodynamic element 1) in the direction of its span. The actuation and control of each one of the auxiliary flaps 6-1, 62, 6-3 is independent of the others, so that each one of the auxiliary flaps 6-1, 6-2, 6-3 can be separately and independently actuated into any one of the positions I, II or III, or an intermediate partial protruding position, at any time. Thereby, the lift generation pattern or distribution along the span of the aerodynamic element 1 can be locally adjusted as needed at each wing segment corresponding to each respective auxiliary flap 6-1, 6-2, 6-3, etc. The control signals for controlling the independent actuation of the several auxiliary flaps 6-1, 6-2, 6-3 advantageously are provided by the flight control system of the aircraft.

Figure 5:
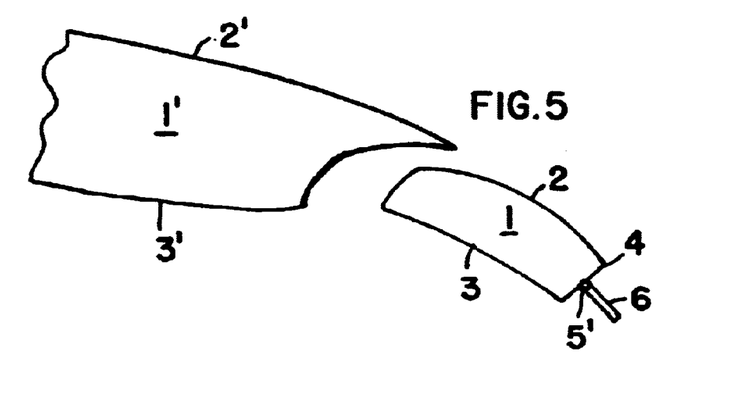
FIG. 5 is a schematic sectional view showing an auxiliary flap according to the invention arranged on the trailing edge of a main flap of an aircraft wing.

FIG. 5 represents another detailed feature of the invention, whereby the aerodynamic element 1 may be a flap 1 of an aircraft wing 1'. The aircraft wing 1' has an upper surface 2' and a lower surface 3', which transition into the upper surface 2 and lower surface 3 of the flap 1. The flap 1 has a planar trailing edge 4, on which is mounted an auxiliary flap 6 according to the invention. In the illustrated example, the auxiliary flap 6 is rotatably or pivotally mounted on a shaft 5', which is similar to the rotatable drum 5 discussed above in connection with FIG. 1, except for having a smaller diameter of the shaft 5', e.g. a diameter substantially corresponding to the thickness of the auxiliary flap 6. With such an arrangement, the auxiliary flap 6 provides a rapid fine-tuning of the lift being generated by the combination of the wing 1' and the main flap 1, in various deployment configurations of the main flap 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An auxiliary flap arrangement for a lift-generating aerodynamic element of an aircraft, wherein the aerodynamic element has opposite first and second aerodynamic surfaces and a trailing edge therebetween, and a central chord line is defined intersecting the trailing edge and extending between the first and second aerodynamic surfaces, and wherein said auxiliary flap arrangement comprises:

an auxiliary flap extending longitudinally in a span direction of the aerodynamic element along the trailing edge of the aerodynamic element; and means for movably connecting said auxiliary flap to the trailing edge of the aerodynamic element and for selectively moving said auxiliary flap to at least one of a first position in which said auxiliary flap protrudes outwardly away from the central chord line beyond the first aerodynamic surface and a second position in which said auxiliary flap protrudes outwardly away from the central chord line beyond the second aerodynamic surface, as well as a third position between said first and second positions in which said auxiliary flap does not protrude outwardly away from the central chord line beyond the first aerodynamic surface and does not protrude outwardly away from the central chord line beyond the second aerodynamic surface, wherein said means comprise sliding means for sliding said auxiliary flap along a sliding plane substantially perpendicular ±10° relative to the central chord line, selectively to said first, second and third positions, in each of which said auxiliary flap lies on said sliding plane substantially perpendicular ±10° relative to the central chord line.

2. The auxiliary flap arrangement according to claim 1, wherein the trailing edge is a flat planar trailing edge extending substantially perpendicularly ±10° relative to the central chord line between the first and second aerodynamic surfaces.

3. The auxiliary flap arrangement according to claim 1, wherein said auxiliary flap has a flat planar rectangular plate shape.

4. In an aircraft having a fuselage and plural lift-generating aerodynamic elements selected from the group consisting of a wing, a wing flap, an aileron, a stabilizer, a rudder, and an elevator directly or indirectly connected to said fuselage, wherein a selected one of said aerodynamic elements has opposite first and second aerodynamic surfaces, a trailing edge therebetween, and a central chord line defined as intersecting said trailing edge and extending between said first and second aerodynamic surfaces, an improvement comprising an auxiliary flap arrangement for selectively increasing and/or decreasing, and leaving uninfluenced an aerodynamic lift generated by said selected aerodynamic element, said auxiliary flap arrangement comprising:
      a drum that extends parallel along said trailing edge in a span direction of said selected aerodynamic element, and that is rotatably supported relative to said trailing edge, and
      at least one auxiliary flap that has a longitudinally extending free edge and a longitudinally extending pivot edge opposite each other and parallel to said trailing edge, and that is connected along said pivot edge to said drum so as to rotatably connect said auxiliary flap to said trailing edge of said selected aerodynamic element so that said auxiliary flap is selectively movable to at least one of a first position in which said free edge of said auxiliary flap protrudes outwardly away from said central chord line beyond said first aerodynamic surface and a second position in which said free edge of said auxiliary flap protrudes outwardly away from said central chord line beyond said second aerodynamic surface, as well as a third position between said first and second positions in which said auxiliary flap does not protrude outwardly away from said central chord line beyond said first aerodynamic surface and does not protrude outwardly away from said central chord line beyond said second aerodynamic surface,
   wherein said drum has a cross-sectional diameter of at least three times a cross-sectional thickness of said auxiliary flap.

5. The improvement in the aircraft according to claim 4, wherein said auxiliary flap in said first position protrudes sufficiently beyond said first aerodynamic surface to project into a first boundary layer of an airflow that flows along said first aerodynamic surface during flight of said aircraft so as to decrease the aerodynamic lift generated by said selected aerodynamic element in a lift direction oriented outwardly away from said first aerodynamic surface, wherein said auxiliary flap in said second position protrudes sufficiently beyond said second aerodynamic surface to project into a second boundary layer of an airflow that flows along said second aerodynamic surface during flight of said aircraft so as to increase the aerodynamic lift generated by said selected aerodynamic element in a lift direction oriented outwardly away from said first aerodynamic surface, and wherein said auxiliary flap in said third position influences neither the first boundary layer nor the second boundary layer so as not to influence the aerodynamic lift generated by said selected aerodynamic element.

6. The improvement in the aircraft according to claim 4, wherein said auxiliary flap has a flat planar plate shape.

7. The improvement in the aircraft according to claim 4, wherein said drum is at least partially received in a recess groove extending in said span direction in and along said trailing edge.

8. The improvement in the aircraft according to claim 7, wherein said drum is a cylindrical drum having a circular cross-section, and said recess groove has a semi-cylindrical open cross-section.

9. The improvement in the aircraft according to claim 4, further comprising a gear wheel drive, a toothed belt drive, a worm drive, or a crank drive connected directly or indirectly between said auxiliary flap and said trailing edge, to selectively rotatably move said auxiliary flap relative to said trailing edge.

10. In an aircraft having a fuselage and plural lift-generating aerodynamic elements selected from the group consisting of a wing, a wing flap, an aileron, a stabilizer, a rudder, and an elevator directly or indirectly connected to said fuselage, wherein a selected one of said aerodynamic elements has opposite first and second aerodynamic surfaces, a trailing edge therebetween, and a central chord line defined as intersecting said trailing edge and extending between said first and second aerodynamic surfaces, an improvement comprising an auxiliary flap arrangement for selectively increasing and/or decreasing, and leaving uninfluenced an aerodynamic lift generated by said selected aerodynamic element, said auxiliary flap arrangement comprising at least one auxiliary flap that is movably mounted on said trailing edge of said selected aerodynamic element to be selectively movable to at least one of a first position in which said auxiliary flap protrudes outwardly away from said central chord line beyond said first aerodynamic surface and a second position in which said auxiliary flap protrudes outwardly away from said central chord line beyond said second aerodynamic surface, as well as a third position between said first and second positions in which said auxiliary flap does not protrude outwardly away from said central chord line beyond said first aerodynamic surface and does not protrude outwardly away from said central chord line beyond said second aerodynamic surface, wherein said auxiliary flap has a longitudinally extending free edge and a longitudinally extending pivot edge opposite each other and parallel to said trailing edge, wherein said auxiliary flap is rotatably connected along said pivot edge to said trailing edge of said selected aerodynamic element, wherein said free edge of said auxiliary flap protrudes beyond said first aerodynamic surface in said first position and protrudes beyond said second aerodynamic surface in said second position, and wherein said auxiliary flap is further slidably connected to said trailing edge, so that said auxiliary flap can selectively slide into said first position and said second position on a plane extending along said trailing edge between said first aerodynamic surface and said second aerodynamic surface.

11. In an aircraft having a fuselage and plural lift-generating aerodynamic elements selected from the group consisting of a wing, a wing flap, an aileron, a stabilizer, a rudder, and an elevator directly or indirectly connected to said fuselage, wherein a selected one of said aerodynamic elements has opposite first and second aerodynamic surfaces, a trailing edge therebetween, and a central chord line defined as intersecting said trailing edge and extending between said first and second aerodynamic surfaces, an improvement comprising an auxiliary flap arrangement for selectively increasing and/or decreasing, and leaving uninfluenced an aerodynamic lift generated by said selected aerodynamic element, said auxiliary flap arrangement comprising at least one auxiliary flap that has opposite longitudinally extending first and second free edges and opposite first and second side edges extending between said first and second free edges, and wherein said auxiliary flap is slidably mounted on and connected to said trailing edge of said selected aerodynamic element, so that said auxiliary flap is selectively slidable to at least one of a first position in which said first free edge of said auxiliary flap protrudes outwardly away from said central chord line beyond said first aerodynamic surface and a second position in which said second free edge of said auxiliary flap protrudes outwardly away from said central chord line beyond said second aerodynamic surface, as well as a third position between said first and second positions in which said first and said second free edges do not protrude beyond said first and second aerodynamic surfaces.

12. The improvement in the aircraft according to claim 11, further particularly comprising first and second guide rails extending parallel and spaced apart from each other in a direction between said first and second aerodynamic surfaces on said trailing edge, and wherein said first and second side edges of said auxiliary flap are respectively slidingly received in said first and second guide rails to slidably connect said auxiliary flap to said trailing edge.

13. The improvement in the aircraft according to claim 12, wherein said guide rails each extend entirely from said first aerodynamic surface to said second aerodynamic surface across said trailing edge.

14. The improvement in the aircraft according to claim 11, wherein said auxiliary flap has an opening therein, and further comprising an eccentric drive cam that is rotatable relative to said trailing edge and that is received in said opening of said auxiliary flap to slidingly drive said auxiliary flap.

15. The improvement in the aircraft according to claim 11, further comprising a crank drive, a toothed rack drive, a pneumatic cylinder drive, or a hydraulic cylinder drive connected directly or indirectly between said auxiliary flap and said trailing edge, to selectively slidingly move said auxiliary flap relative to said trailing edge.

16. The improvement in the aircraft according to claim 4, further comprising an electric motor, a hydraulic motor or a pneumatic motor connected directly or indirectly to said auxiliary flap to selectively move said auxiliary flap.

17. The improvement in the aircraft according to claim 4, wherein said aircraft further includes a flight controller, and further comprising a signal conductor connected from said flight controller to said auxiliary flap arrangement to provide control signals from said flight controller for controlling the selective movement of said auxiliary flap.

18. The improvement in the aircraft according to claim 4, wherein said auxiliary flap extends substantially perpendicularly ±10° relative to said central chord line in said first and second positions, and extends substantially parallel to or along ±10° said central chord line in said third position.

19. The improvement in the aircraft according to claim 11, wherein said auxiliary flap extends substantially perpendicularly ±10° relative to said central chord line in all of said first, second, and third positions.

20. The improvement in the aircraft according to claim 4, wherein said at least one auxiliary flap comprises at least two of said auxiliary flaps arranged independently from each other at two locations along said trailing edge of said selected aerodynamic element in said span direction of said selected aerodynamic element.

21. The improvement in the aircraft according to claim 4, wherein said aircraft includes said wing and said wing flap movably arranged at a rear edge of said wing, and wherein said selected aerodynamic element is said wing flap, whereby said auxiliary flap is movably mounted on said trailing edge of said wing flap.

22. The improvement in the aircraft according to claim 11, wherein said trailing edge is a flat planar trailing edge extending between said first and second aerodynamic surfaces.

23. The improvement in the aircraft according to claim 4, wherein said auxiliary flap in said first position protrudes sufficiently beyond said first aerodynamic surface to project into a first boundary layer of an airflow that flows along said first aerodynamic surface during flight of said aircraft so as to decrease the aerodynamic lift generated by said selected aerodynamic element in a lift direction oriented outwardly away from said first aerodynamic surface, wherein said auxiliary flap in said second position protrudes sufficiently beyond said second aerodynamic surface to project into a second boundary layer of an airflow that flows along said second aerodynamic surface during flight of said aircraft so as to increase the aerodynamic lift generated by said selected aerodynamic element in a lift direction oriented outwardly away from said first aerodynamic surface, and wherein said auxiliary flap in said third position influences neither the first boundary layer nor the second boundary layer so as not to influence the aerodynamic lift generated by said selected aerodynamic element.

24. The improvement in the aircraft according to claim 11, wherein said auxiliary flap has a flat planar plate shape.

25. The improvement in the aircraft according to claim 11, further comprising an electric motor, a hydraulic motor or a pneumatic motor connected directly or indirectly to said auxiliary flap to selectively move said auxiliary flap.

26. The improvement in the aircraft according to claim 11, wherein said aircraft further includes a flight controller, and further comprising a signal conductor connected from said flight controller to said auxiliary flap arrangement to provide control signals from said flight controller for controlling the selective movement of said auxiliary flap.

27. The improvement in the aircraft according to claim 11, wherein said at least one auxiliary flap comprises at least two of said auxiliary flaps arranged independently from each other at two locations along said trailing edge of said selected aerodynamic element in a span direction of said selected aerodynamic element.

28. The improvement in the aircraft according to claim 11, wherein said aircraft includes said wing and said wing flap movably arranged at a rear edge of said wing, and wherein said selected aerodynamic element is said wing flap, whereby said auxiliary flap is movably mounted on said trailing edge of said wing flap.

* * * * *

UNITED STATES PATENT AND TRADEMARK OFFICE
CERTIFICATE OF CORRECTION

PATENT NO.     : 6,641,089 B2  Page 1 of 1
DATED          : November 4, 2003
INVENTOR(S)    : Schwetzler et al.

It is certified that error appears in the above-identified patent and that said Letters Patent is hereby corrected as shown below:

<u>Title page,</u>
Item [56], References Cited, OTHER PUBLICATIONS, "Journal of Aircraft" reference, after "and", replace "Refection" by -- Reflection --;

<u>Column 2,</u>
Line 41, after "an", replace "intersection-of" by -- intersection of --;
Line 48, after "90°", replace "+" by -- ± --;

<u>Column 6,</u>
Line 59, after "6-1,", replace "62" by -- 6-2 --;

<u>Column 11,</u>
Line 8, after "claim", replace "4" by -- 11 --.

Signed and Sealed this

Second Day of March, 2004

JON W. DUDAS
*Acting Director of the United States Patent and Trademark Office*